US008704394B1

(12) United States Patent
Jones

(10) Patent No.: US 8,704,394 B1
(45) Date of Patent: *Apr. 22, 2014

(54) VERTICAL AXIS WIND TURBINES

(71) Applicant: Thomas Jones, Santa Fe, TX (US)

(72) Inventor: Thomas Jones, Santa Fe, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/927,324

(22) Filed: Jun. 26, 2013

Related U.S. Application Data

(63) Continuation-in-part of application No. 13/222,629, filed on Aug. 31, 2011, now Pat. No. 8,497,592.

(51) Int. Cl.
F03D 9/02 (2006.01)
(52) U.S. Cl.
USPC .............................................. 290/44; 290/55
(58) Field of Classification Search
USPC ....................................................... 290/44, 55
See application file for complete search history.

(56) References Cited

U.S. PATENT DOCUMENTS

| 7,303,369 | B2 | 12/2007 | Rowan et al. | |
|---|---|---|---|---|
| 7,352,076 | B1 | 4/2008 | Gabrys | |
| 2006/0263198 | A1 | 11/2006 | Toby Kinkaid | |
| 2008/0187432 | A1* | 8/2008 | Cowan | 415/4.4 |
| 2009/0200808 | A1 | 8/2009 | Parmley, Sr. | |
| 2009/0224554 | A1 | 9/2009 | Flynn | |
| 2009/0224606 | A1 | 9/2009 | Gandy | |
| 2010/0013238 | A1 | 1/2010 | Jessie et al. | |
| 2010/0213723 | A1* | 8/2010 | Kazadi | 290/55 |
| 2010/0296913 | A1* | 11/2010 | Lee | 415/4.2 |
| 2011/0103942 | A1* | 5/2011 | Green et al. | 415/183 |
| 2011/0107684 | A1* | 5/2011 | Flores | 52/29 |
| 2012/0019002 | A1* | 1/2012 | Lee | 290/50 |
| 2012/0074705 | A1* | 3/2012 | Stephens et al. | 290/55 |
| 2012/0302228 | A1* | 11/2012 | Gray | 455/422.1 |

* cited by examiner

Primary Examiner — Tho D Ta
(74) Attorney, Agent, or Firm — Goldstein Law Offices, P.C.

(57) ABSTRACT

A vertical axis wind turbine is provided. The turbine includes a plurality of support arms. The turbine includes a housing coupled to the arms such that the housing is between the arms. The turbine includes a band extending around the housing. The turbine includes a blade coupled to the band. The turbine includes an electric generator housed within the housing. The generator is operative based at least in part on the band and the blade rotating between the arms on a vertical rotation axis.

20 Claims, 13 Drawing Sheets

US 8,704,394 B1

VERTICAL AXIS WIND TURBINES

CROSS-REFERENCE TO RELATED APPLICATIONS

The present application is a continuation-in-part (CIP) of U.S. patent application Ser. No. 13/222,629, filed on Aug. 31, 2011, which is herein fully incorporated by reference for all purposes.

TECHNICAL FIELD

Generally, the present disclosure relates to renewable energy. More particularly, the present disclosure relates to vertical axis wind turbines.

BACKGROUND

In the present disclosure, where a document, an act and/or an item of knowledge is referred to and/or discussed, whether directly and/or indirectly, then this reference and/or discussion is not an admission that the document, the act and/or the item of knowledge and/or any combination thereof was at the priority date, publicly available, known to the public, part of common general knowledge and/or otherwise constitutes prior art under the applicable statutory provisions and/or is known to be relevant to an attempt to solve any problem with which the present disclosure is concerned.

Identification of new non-fossil fuel based energy sources, which are both commercially viable and/or environmentally benign, has become an important national security and/or technological need. With increasing domestic energy consumption, such technological development not only enhances national security, reduces visual pollution, fuels economic growth, creates jobs and/or contributes to global environmental sustainability, but also reduces foreign energy dependence.

Many countries and/or businesses often commit to make better use of renewable and/or nonpolluting energy sources. Wind energy is a popular source explored by many not just because wind energy is renewable and/or nonpolluting, but also because wind energy is free. Although wind farms with acres of large wind turbines have proved relatively successful, such wind farms are relatively rare and/or generally involve substantial economic investment, visual pollution and/or contentious land use issues. A broader, simpler, more visually appealing and/or geographically universal wind turbine construction and/or management approach may be required to bring wind energy to its full potential.

Also, in United States, utility poles are ubiquitous and/or often include power transmission capabilities. In fact, miles of open roads, spreading through wide open spaces, are lined with a seemingly endless amount of utility poles. A significant amount of wind energy, which often encounters these poles, remains underutilized. Thus, by better utilizing already existing utility poles for wind energy generation, increasing domestic energy consumption can be more effectively managed without substantial economic investment.

Additionally, some electric utility companies, such as electric distribution cooperatives, do not generate electric power. Rather, these companies purchase electricity from another entity. Thus, these companies are caught in the middle of a vibrant energy supply and/or demand market and, generally, do not have control over rising energy costs. Similarly, these companies also often face arbitrary political mandates and/or unreasonable customer demands for prompt provision of renewable energy without having any control over how to provide such energy.

Accordingly, there may be a need to more efficiently create and distribute renewable energy, decrease dependency on centralized electric energy generation, lessen fossil fuel use in electricity generation, minimize foreign energy dependence, reduce the price of electricity, create a new renewable energy business model, while implementing a job creating solution using an already existing infrastructure.

While certain aspects of conventional technologies have been discussed to facilitate the present disclosure, no technical aspects are disclaimed. The claims may encompass one and/or more of the conventional technical aspects discussed herein.

BRIEF SUMMARY

According to an example embodiment of the present disclosure a vertical axis wind turbine is provided. The turbine includes a plurality of support arms. The turbine includes a housing coupled to the arms such that the housing is between the arms. The turbine includes a band extending around the housing. The turbine includes a blade coupled to the band. The turbine includes an electric generator housed within the housing. The generator is operative based at least in part on the band and the blade rotating between the arms on a vertical rotation axis.

According to an example embodiment of the present disclosure a system is provided. The system includes a first vertical axis wind turbine. The first turbine includes a plurality of support arms, a housing coupled to the arms such that the housing is between the arms, a band extending around the housing, a blade coupled to the band, and an electric generator housed within the housing. The generator is operative based at least in part on the band and the blade rotating between the arms on a vertical rotation axis. The system includes a second vertical axis wind turbine coupled to one of the arms and the housing such that the second turbine is between the one of the arms and the housing. The second turbine includes a base and a rotor. The base includes a first magnet. The rotor includes a second magnet. The rotor includes a plurality of vertically spiraling foils. The rotor is positioned adjacent to the base such that the first magnet is disposed adjacent to the second magnet thereby causing the rotor to be rotatingly suspended above the base. The foils are configured for vertical axis rotation independent of the blade. The blade and at least one of the foils are shaped differently.

According to an example embodiment of the present disclosure a method is provided. The method includes receiving electric current generated at least in part via operation of a system including a first vertical axis wind turbine and a second vertical axis wind turbine. The first turbine includes a plurality of support arms, a housing coupled to the arms such that the housing is between the arms, a band extending around the housing, a blade coupled to the band, and an electric generator housed within the housing. The generator is operative based at least in part on the band and the blade rotating between the arms on a vertical rotation axis. The second turbine is coupled to one of the arms and the housing such that the second turbine is between the one of the arms and the housing. The second turbine includes a base and a rotor. The base includes a first magnet. The rotor includes a second magnet. The rotor includes a plurality of vertically spiraling foils. The rotor is positioned adjacent to the base such that the first magnet is disposed adjacent to the second magnet thereby causing the rotor to be rotatingly suspended above the base. The foils are configured for vertical axis rotation independent of the blade. The blade and at least one of the foils are shaped differently.

The present disclosure may be embodied in the form illustrated in the accompanying drawings. Attention is called to the fact, however, that the drawings are illustrative. Variations are contemplated as being part of the present disclosure, limited only by the scope of the claims.

BRIEF DESCRIPTION OF THE DRAWINGS

The accompanying drawings illustrate example embodiments of the present disclosure. Such drawings are not to be construed as necessarily limiting the present disclosure. Like numbers and/or similar numbering scheme can refer to like and/or similar elements throughout.

DETAILED DESCRIPTION OF THE PREFERRED EMBODIMENTS

Figure 1A:
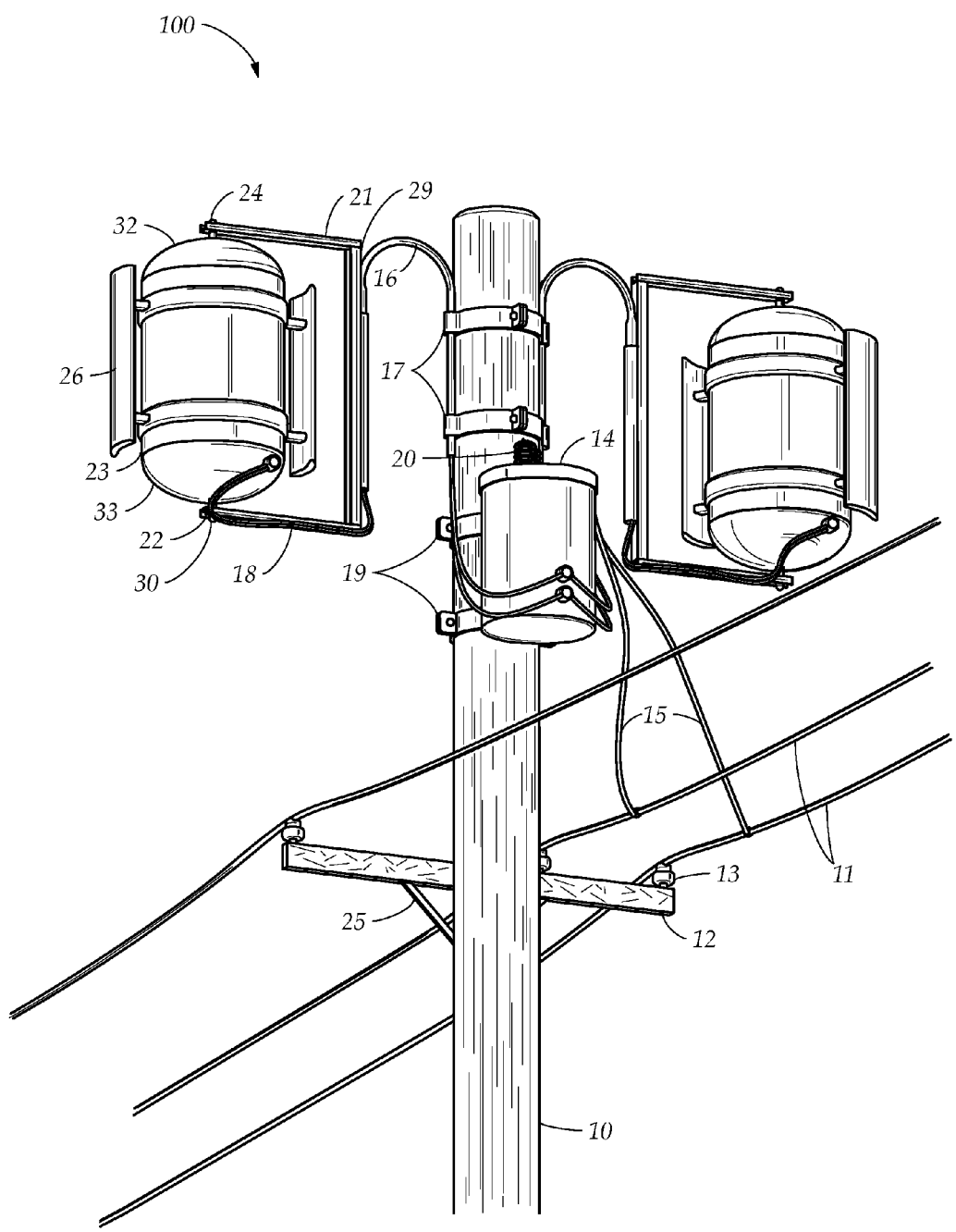
FIG. 1A illustrates an example mode of operation of a vertical axis wind turbine according to the present disclosure.

The present disclosure is now described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the art. Also, features described with respect to certain example embodiments may be combined in and/or with various other example embodiments. For example, the disclosed embodiments may individually and/or collectively be components of a larger system, wherein other procedures may take precedence over or otherwise modify their application and/or operation. Also, a number of steps may be required before, after, or concurrently with the following embodiments. Different aspects and/or elements of the example embodiments may be combined in a similar manner.

The terminology used herein can imply direct or indirect, full or partial, action or inaction. For example, when an element is referred to as being "on," "connected" or "coupled" to another element, then the element can be directly connected or coupled to the other element and/or intervening elements may be present. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes can include three dimensional (3D) printing, laser cuffing, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof. Any and/or all elements, as disclosed herein, can be rigid, flexible and/or any other combinations thereof. Any and/or all elements, as disclosed herein, can be identical to and/or different from each other in material, shape, size and/or any dimension, such as length, width, height, depth, area, volume, breadth, density, temperature, resistance and so forth.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

U.S. Pat. No. 7,303,369 is herein fully incorporated by reference for all purposes. However, if any disclosures are incorporated herein by reference and such incorporated disclosures conflict in part and/or in whole with the present disclosure, then to the extent of conflict, and/or broader disclosure, and/or broader definition of terms, the present disclosure controls. Also, if such incorporated disclosures conflict in part and/or in whole with one another, then to the extent of conflict, the later-dated disclosure controls.

FIG. 1A illustrates an example mode of operation of a vertical axis wind turbine according to the present disclosure. Any element of a vertical axis wind turbine 100 can include metal, plastic or a light-weight composite material and be rustproof. Vertical axis wind turbine 100 includes a plurality of support arms 21, 22, a housing 23, a generator and a plurality of blades 26.

Arms 21, 22 are coupled to each other via a coupling rod 29. Coupling rod 29 is coupled via a bent rod 16 to a utility pole 10 above a plurality of power lines 11, which are resting on a horizontal cross-arm 12 via an insulator 13. Cross-arm 12 is supported by a support arm 25. In another example embodiment, arms 21, 22 are individually coupled to utility pole 10. In yet another example embodiment, arms 21, 22 are coupled in a V-shape, L-shape or A-shape to utility pole 10. In yet still another example embodiment, arms 21, 22 are operative for coupling to a cell site, an antenna, a house roof, a transmission tower, a water tower, a lamppost or a sign pole. In yet additional example embodiment, arms 21, 22 can form and/or be included in a bracket.

Housing 23 is coupled to arms 21, 22 via a plurality of caps 32, 33 and a plurality of shafts 24, 30, which vertically extend through arms 21, 22. Housing 23 rotates on a vertical axis of rotation and with respect to arms 21, 22.

Housing 23 also includes an outer wall defining a space within housing 23. The space is interior space and can be sealed to be waterproof and/or airtight. Although housing 23 is shown in a cylindrical shape, housing 23 can be of other shapes, such a sphere, a cube, a cuboid, a prism, a cone, a pyramid and so forth.

A generator is stationed within the interior space. The generator generates an electric current in response to at least partial rotation of housing 23 and/or blades 26. The electric current can include an alternating current (AC). However, in another example embodiment, the electric current can include a direct current (DC). Regardless, the generator is coupled to a distribution transformer 14 via a wire 18, which conducts the generated electric current. The generator can include a generator shaft. Distribution transformer 14 is coupled to utility pole 10 via a plurality of bands 17, which also couple a bent rod 16. Bands 17 are adjustable via a plurality of adjusters 19.

Blades 26 are coupled to an external surface of the outer wall of housing 23. Blades 26 extend in a vertical direction, parallel to the external surface of housing 23. Blades 26 are coupled to the external surface of housing 23 via a connector and a band extending around the outer wall of housing 23. In another example embodiment, the band can rotate with respect to the generator and/or housing 23.

Caps 32, 33 are coupled to opposing sides/bases of housing 23. Caps 32, 33 can be stationary with respect to housing 23. Although a portion of caps 32, 33 is hemispherical, such as dome shaped, in general, caps 32, 33 can be flat and/or rectangular and/or any other shape, such as a circle, a triangle and so forth. Each cap 32, 33 includes a bearing. Housing 23 rotates around the bearings. Cap 33 includes an opening for wire 18, which connects to power lines 11 via distribution transformer 14, a coil 20 and a plurality of connecting wires 15. The opening for wire 18 can include a grommet. Cap 32 is coupled to arm 21 via shaft 24 extending into a portion of cap 32. Cap 33 is coupled to arm 22 via shaft 30 extending into a portion of cap 33.

In another example embodiment, vertical wind turbine 100 can include a heater to generate a small amount of heat near bearings. For example, such generated heat can be used to keep the bearings from freezing. Such heater can be self-powered, such as via a battery, or powered via the generated current from turbine 100.

Figure 1B:
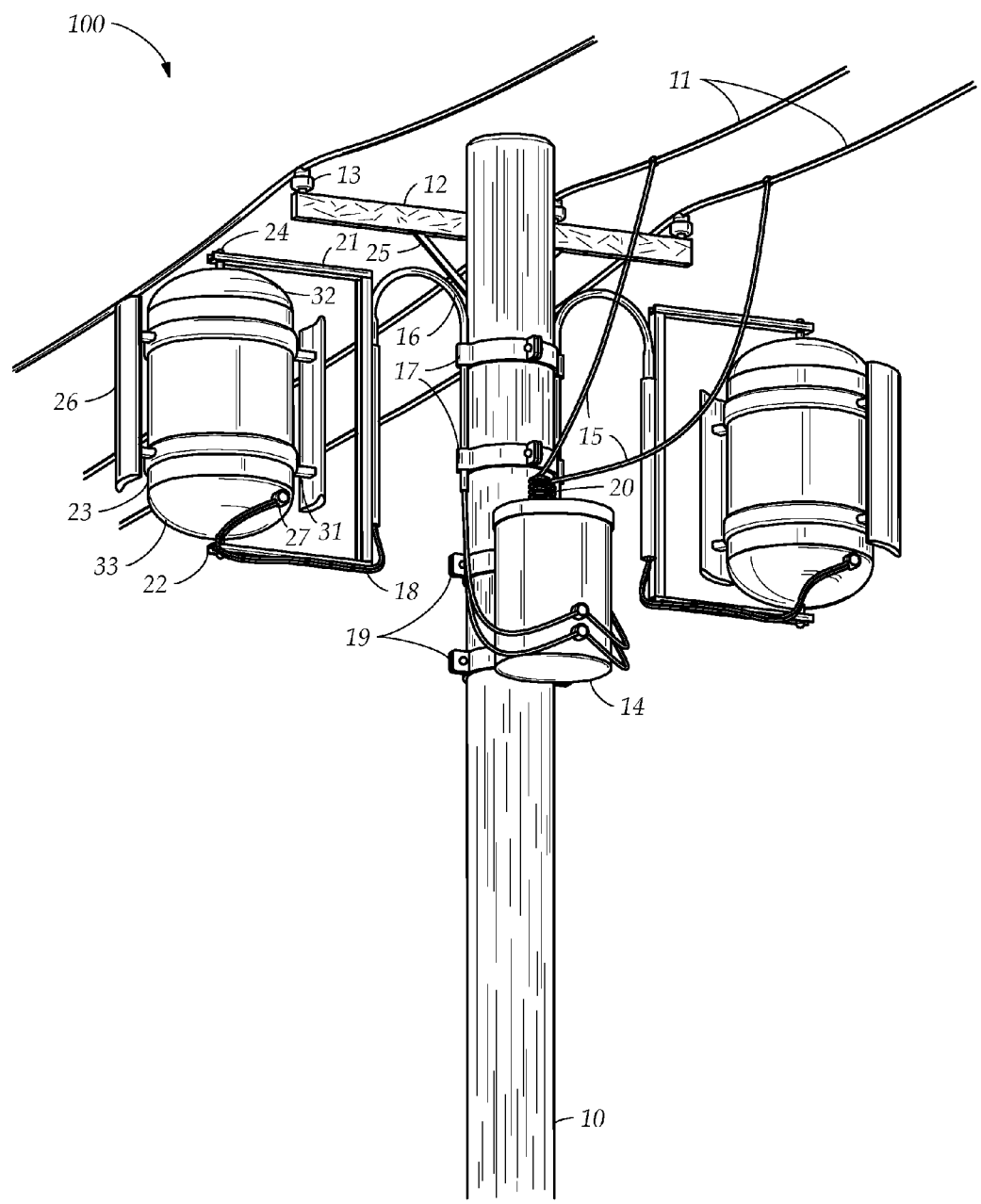
FIG. 1B illustrates another example mode of operation of a vertical axis wind turbine according to the present disclosure.

FIG. 1B illustrates another example mode of operation of a vertical axis wind turbine according to the present disclosure. Some elements of this figure are described above. Thus, same and/or similar reference characters identify same and/or like components described above and any repetitive detailed description thereof will hereinafter be omitted or simplified in order to avoid complication.

Note that the opening for wire 18 is depicted via opening 27, which can include a grommet. Also, note that the connector for blade 26 is depicted via a connector 31. Resultantly, blades 26 are coupled to the external surface of housing 23 via connector 31 and the band extending around the outer wall of housing 23.

A difference between FIGS. 1A and 1B is a placement of vertical axis wind turbine 100. In FIG. 1B, coupling rod 29 is coupled via bent rod 16 to utility pole 10 below power lines 11. Thus, vertical axis wind turbine is positioned below power lines 11.

In another example mode of operation, on utility pole 10, at least one vertical axis wind turbine 100 is positioned below power lines 11 and at least one vertical axis wind turbine 100 is positioned above power lines 11. For example, two opposing vertical axis wind turbines 100 can be positioned below power lines 11 and two opposing vertical axis wind turbines 100 can be positioned above power lines 11. For another example, a plurality of adjacent vertical axis wind turbines 100 can be positioned below/above power lines 11 on one side of utility pole 10 and plurality of adjacent vertical axis wind turbines 100 can be positioned below/above power lines 11 on opposing vertically extending side of utility pole 10. For yet another example, a plurality of vertical axis wind turbines 100 can be positioned on one side only. Note that any number of turbines 100 can be coupled to pole 10 in any combinatory manner.

Figure 2A:
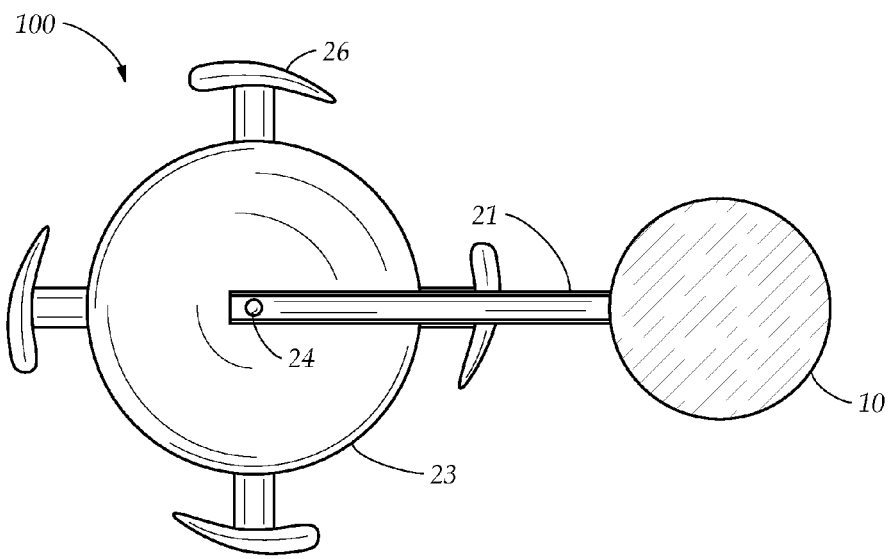
FIGS. 2A and 2B illustrate a top view of an example embodiment of a vertical axis wind turbine in operation according to the present disclosure.
Figure 2B:
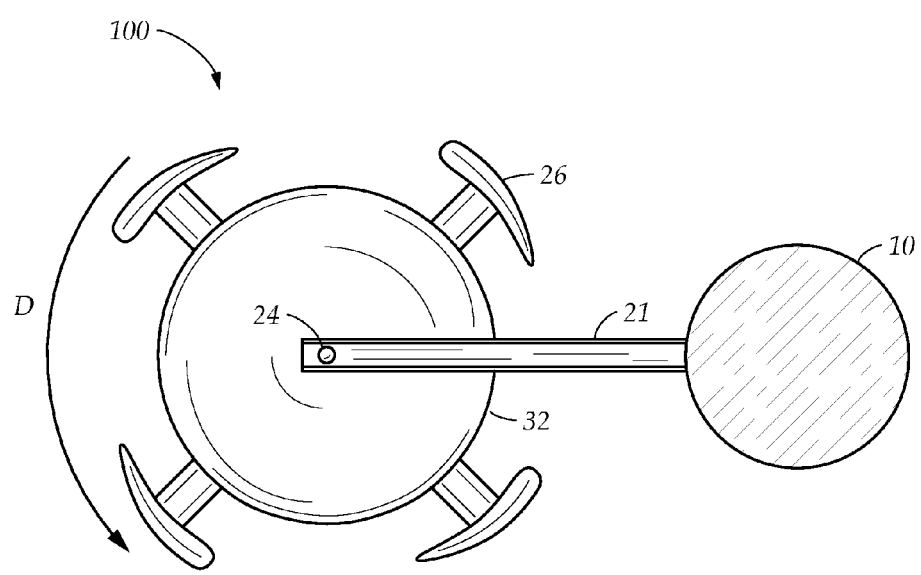

FIGS. 2A and 2B illustrate a top view of an example embodiment of a vertical axis wind turbine in operation according to the present disclosure. Some elements of this figure are described above. Thus, same and/or similar reference characters identify same and/or like components described above and any repetitive detailed description thereof will hereinafter be omitted or simplified in order to avoid complication.

Vertical axis wind turbine 100 is coupled to utility pole 10 via cap 32, shaft 24 and arm 21. Vertical axis wind turbine 100 rotates on a vertical axis in a direction D. As vertical axis wind turbine 100 rotates, an electric current is generated by the generator stationed within housing 23. Note that blades 26 are below are 21.

Figure 3:
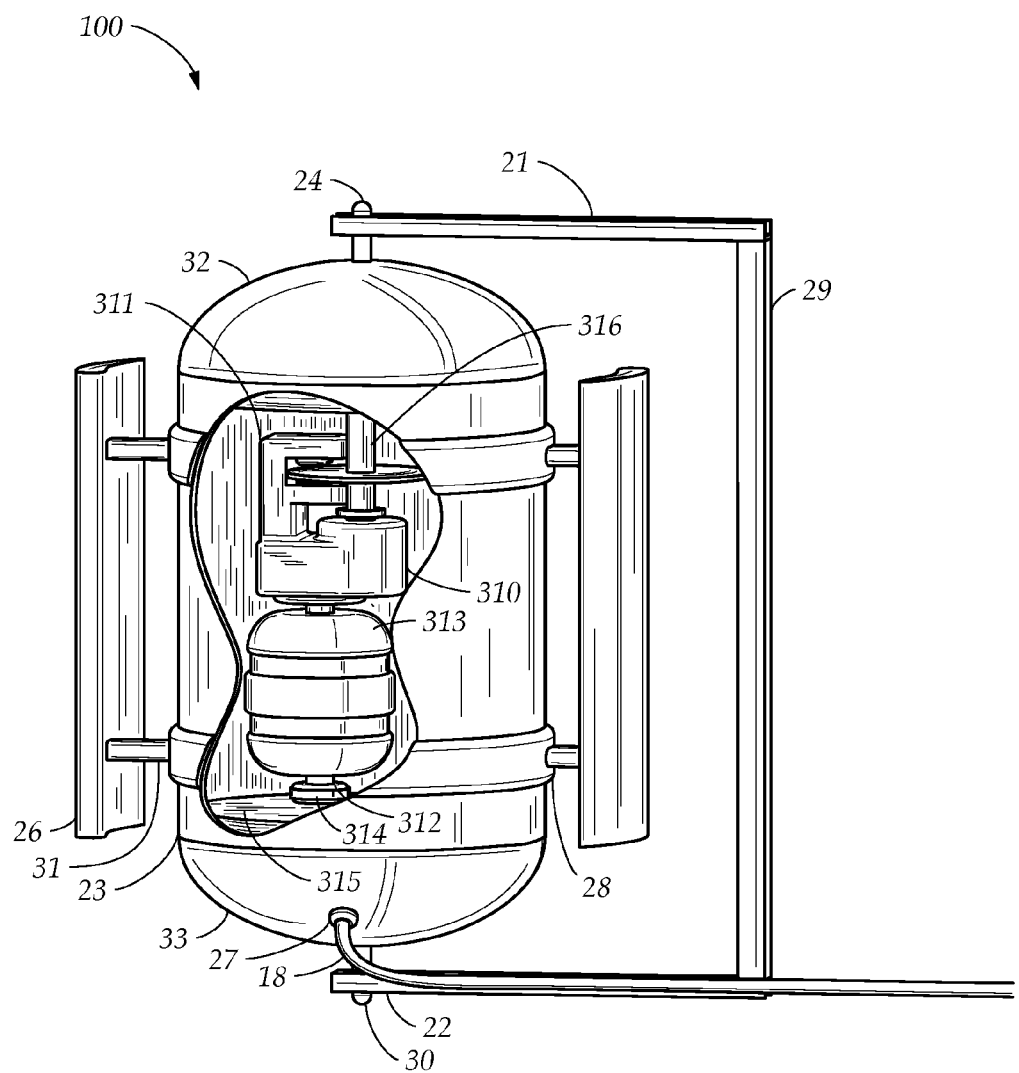
FIG. 3 illustrates an internal perspective view of an example embodiment of a vertical axis wind turbine according to the present disclosure.

FIG. 3 illustrates an internal perspective view of an example embodiment of a vertical axis wind turbine according to the present disclosure. Some elements of this figure are described above. Thus, same and/or similar reference characters identify same and/or like components described above and any repetitive detailed description thereof will hereinafter be omitted or simplified in order to avoid complication.

Note that the band around housing 23 is depicted as a band 28, which can extend horizontally and/or diagonally in any manner. A central shaft 316 can extend from an external surface of cap 32 into a gear box 310. Although central shaft 316 can rotate at a low speed and include a plurality of shaft-to-shaft stabilizing bearings 311, in another example embodiment shaft 316 can also remain stationary. Central shaft 316 includes a first gear wheel mounted thereon. A generator 313 includes a generator shaft 312 with a second gear wheel mounted thereon, which can rotate at a high speed. The first gear wheel meshes with the second gear wheel in gear wheel box 310. Although central shaft 316 and generator shaft 312 are parallel to each other, in another example embodiment, shaft 316 and shaft 312 are not parallel to each other. Generator shaft 312 extends from a base 314 mounted on a surface 315 of cap 33 through generator 313 into gear box 310. Generator 313 can include a controller or at least one magnet. Thus, as housing 23 rotates, central shaft 316 rotates and thereby facilitates meshing of gear wheels within gear box 310, which in turn power generator 313 to generate an electric current for conduction via wire 18 to distribution transformer 14. Band 28 can rotate with respect to 313 generator and/or housing 23. Note that at least one of shaft 316 and shaft 213 can be stationary with at least one of the first gear wheel and the second gear wheel rotating. In another example embodiment, at least one of arms 21, 22, housing 23, caps 32, 33, connector 31, band 28, coupling rod 29, shafts 24, 30, bent rod 16 and blades 26 includes non-conductive material, such as porcelain or composite polymer materials.

Figure 4:
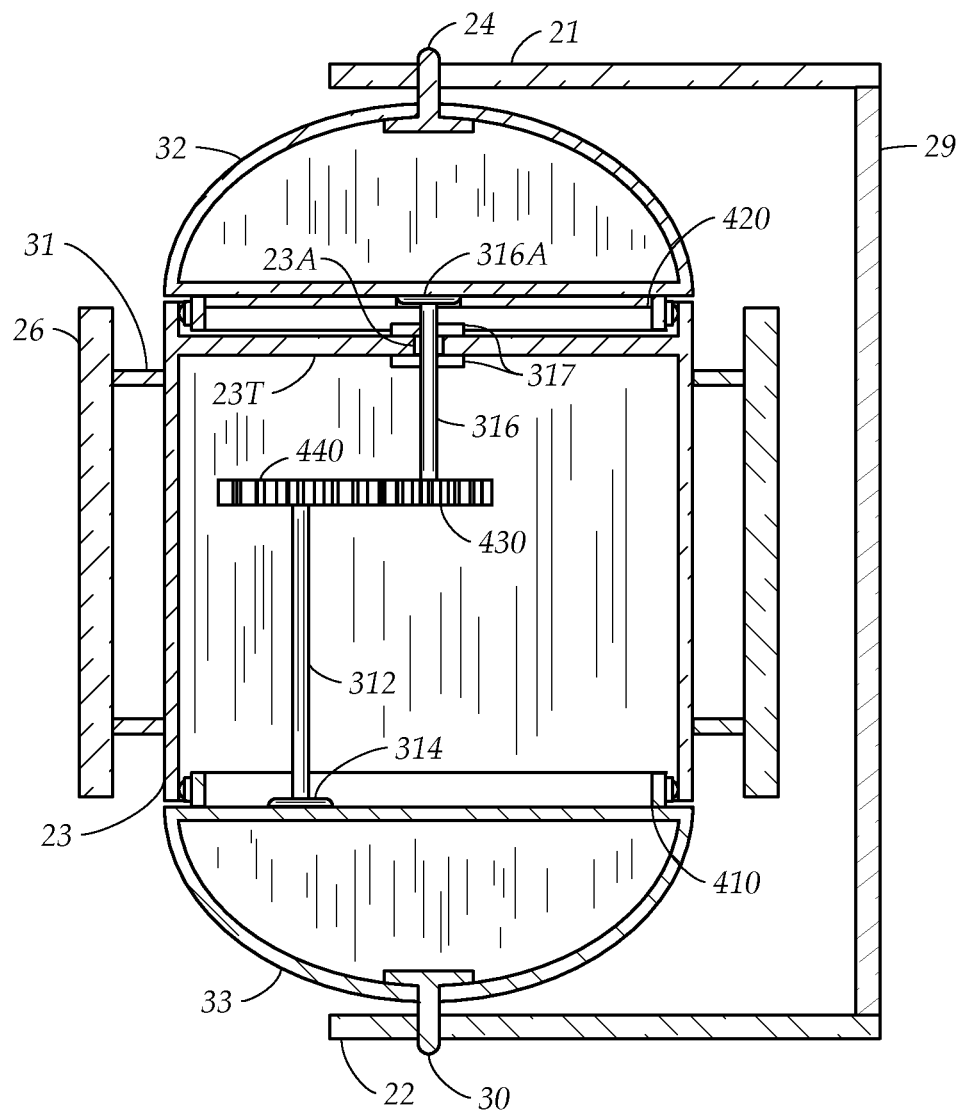
FIG. 4 illustrates a side view of an example embodiment of a vertical axis wind turbine according to the present disclosure.

FIG. 4 illustrates a side view of an example embodiment of a vertical axis wind turbine according to the present disclosure. Some elements of this figure are described above. Thus, same and/or similar reference characters identify same and/or like components described above and any repetitive detailed description thereof will hereinafter be omitted or simplified in order to avoid complication.

Cap 32 includes a bearing 420. Cap 33 includes a bearing 410. Using bearings 410, 420, housing 23 rotates on a vertical axis. In another example embodiment, bearings 410, 420 are coupled to a heater to generate a small amount of heat near bearings 410, 420 to keep bearings 410, 420 from freezing.

Housing 23 has a housing roof 23T and a housing side wall. Housing roof 23T is coupled to the housing side wall. Blades 26 are secured to an external surface of the housing side wall. Housing roof 23T has a central opening 23A through which central shaft 316 extends, but central shaft 316 is also coupled to housing roof 23T via a connection hardware 317. Central shaft 316 is stabilized by a connection to cap 32 via a shaft bearing 316A.

Central shaft 316 includes a first gear wheel 430. Generator shaft 312 includes a second gear wheel 440 meshing with first gear wheel 430 at a meshing point (MP). As central shaft 316 rotates with housing 23, first gear wheel 430 meshes with second gear wheel 440 at MP and powers generator 312. Generator shaft 312 is located in an offset position from a central axis of housing 23 and, as previously noted, is secured to base 314 of cap 33 with a lower bearing, which allows axial rotation of generator shaft 312. However, note that at least a portion of shaft 312 can be co-axial to shaft 316.

In another example embodiment, by incorporating vertical wind turbine 100, as described herein, on already existing infrastructure, energy produced via turbine 100 can reduce a demand for energy from a power plant thereby efficiently creating and distributing renewable energy, decrease dependency on centralized electric energy generation, lessen fossil fuel use in electricity generation, minimize foreign energy dependence, reduce the price of electricity, create a new renewable energy business model, while implementing a job creating solution using an already existing infrastructure. Moreover, turbine 100 can produce electricity incrementally without overloading the electrical grid. Furthermore, by placing turbine 100 on top of utility poles 10, whether above or below transmission lines 11, more wind power can be captured.

Figure 5:
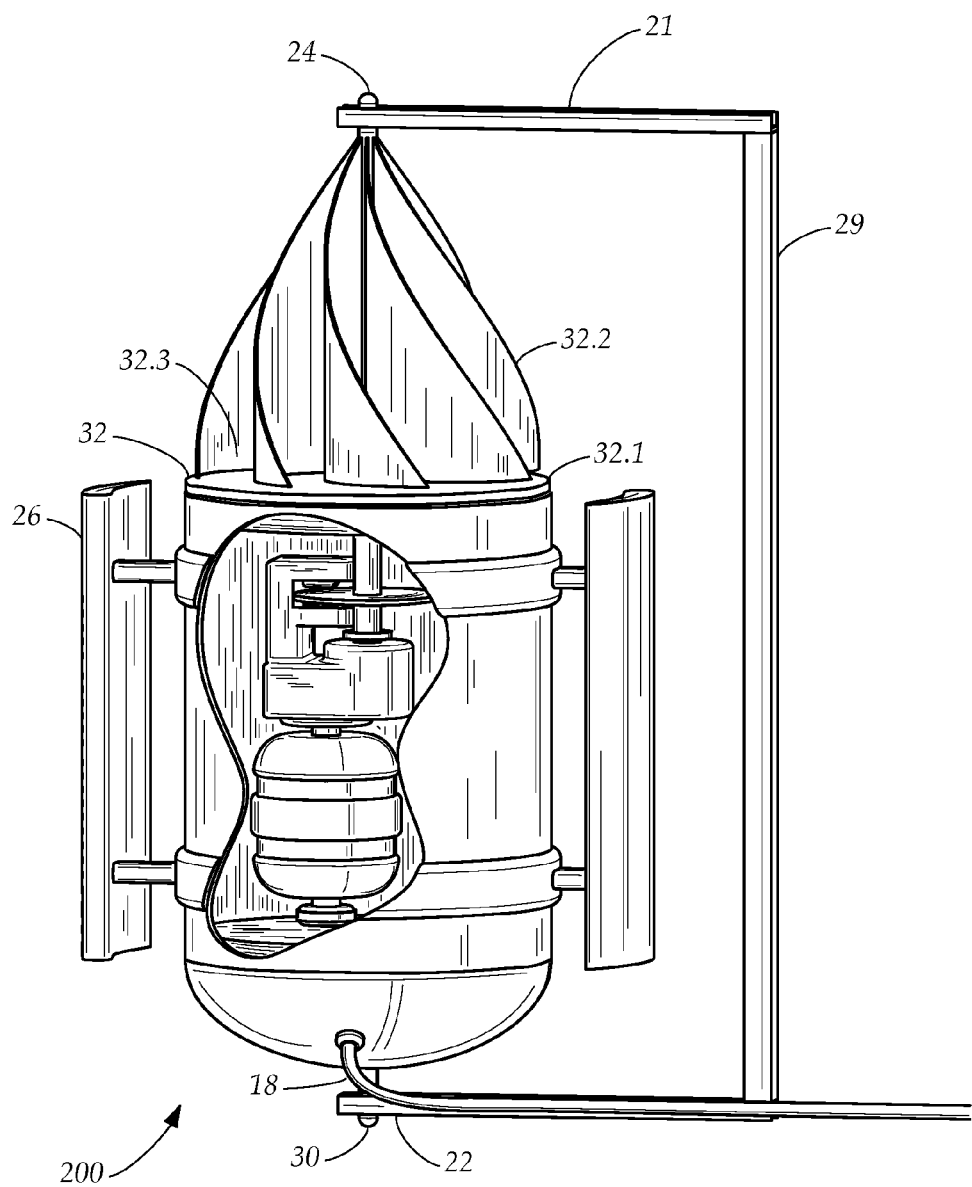
FIG. 5 illustrates a perspective view of an example embodiment of a vertical axis wind turbine having a top vertical axis wind turbine according to the present disclosure.

FIG. 5 illustrates a perspective view of an example embodiment of a vertical axis wind turbine having a top vertical axis wind turbine according to the present disclosure. Some elements of this figure are described above. Thus, same and/or similar reference characters identify same and/or like components described above and any repetitive detailed description thereof will hereinafter be omitted or simplified in order to avoid complication.

A wind turbine 200 is coupled to arms 21, 22 via shafts 24, 30, which extend through arms 21, 22. Shafts 24, 30 can rotate or be fixed with respect to arms 21, 22. Housing 23 includes a top vertical axis wind turbine 32, which replaces cap 32 as shown in FIGS. 1A-4. Turbine 32 includes a base 32.1 and a plurality of foils 32.2 having a plurality of open spaces 32.3 in-between. Note that wire 18 can extend via shaft 24. Note that turbine 32 can be coaxial with cap 33 or have different axis with respect to cap 33. Turbine 100 and turbine 200 can be co-axial.

Base 32.1 can be of any shape, such as a parallelogram, a quadrilateral, an ellipse, a triangle, a polygon, a character, a symbol and/or others in at least one dimension. Base 32.1 includes a plurality of magnetic transformers disposed around outer perimeter of base 32.1.

Shaft 24 can be coupled to base 32.1. Shaft 24 can also remain de-coupled with base 32.1. Shaft 24 can also avoid contact with base 32.1. Shaft 24 can extend through base 32.1. Shaft 24 can also be coupled to shaft 316 for dependent wind capture. However, shaft 24 can also be de-coupled from shaft 316 for independent wind capture. Shaft 24 can be segmented. Shaft 24 can include a rotor mounted thereon, which can include a plurality of magnets disposed around outer perimeter of the rotor.

Base 32.1 can include a first magnet having a first polarity. The rotor can include a second magnet having a second polarity. The first magnet and the second magnet are positioned such that the first magnet and the second magnet are adjacent when axially aligned. The first polarity and the second polarity are such that the first magnet and the second magnet repel each other at least when installed as described herein and thereby enable levitation, such as floating and/or suspension, of the rotor above base 32.1. In any combinatory manner, the magnets can be identical to and/or different from each other in number, material, shape, size and/or any dimension, such as length, width, height, depth, area, volume, breadth, density, temperature, resistance and so forth.

Foils 32.2 extend spirally/helically about shaft 24 with spaces 32.3 in-between, while coupled to shaft 24. Foils 32.2 can extend in a rotating manner such that turbine 32 appears like an auger. Note that turbine 32 faces skyward, whether vertically or diagonally. In any combinatory manner, foils 32.2 can be identical to and/or different from each other in number, material, shape, size and/or any dimension, such as length, width, height, depth, area, volume, breadth, density, temperature, resistance and so forth. Foils 32.2 can be curved. Foils 32.2 are shaped to maximize wind energy capture irrespective of wind source, speed and/or direction. Foils 32.2 can be triangular of any type. Foils 32.2 can be linear, curvilinear and/or others. Foils 32.2 can be equally spaced apart and/or non-equally spaced apart in any manner.

The first magnet and the second magnet provide that the rotor and foils 32.2 levitate magnetically off base 32.1. Such levitation reduces friction and enhances ease of rotation, which can allow for avoiding inclusion of at least one bearing. Turbine 32 can include an axial flux alternator using variable resistance coils, which can be individually and selectively turned on or off depending on wind conditions and electrical draw requirements. The coils can also be used to selectively produce mechanical drag for foil braking in high wind conditions and/or for maintenance. The alternator enables efficient energy generation at low rotational speed. The magnets can be shielded from external exposure, such as weather and/or animals. The first magnet and the second magnet can be segmented. Alternatively, the first magnet refers to a plurality of first magnets and the second magnet refers to a plurality of second magnets.

Foils 32.2 can include magnets positioned at their tips. Foils 32.2 are magnetically levitated, such as via floating, above base 32.1, which can reduce friction, noise, vibration, energy loss and/or facilitate in more efficient energy generation. Alternatively, foils 32.2 are coupled to base 32.1, but base 32.1 magnetically levitates above another base.

The alternator includes the magnetic transformers and at least one of the magnets. In any combinatory manner, the magnetic transformers can be identical to and/or different from each other in number, material, shape, size and/or any dimension, such as length, width, height, depth, area, volume, breadth, density, temperature, resistance and so forth. The magnetic transformers can include a cored coil and/or a coreless coil. The magnets can be passive magnets. The transformers generate electricity when the magnets are rotated past the transformers. In one example embodiment, turbine 32 can transmit the generated electricity via wiring of shaft 24, such as within shaft 24, and arm 21, whether internal, external to and/or integral to arm 21. In another example embodiment, turbine 32 can transmit the generated electricity via wiring to shaft 316 to generator 313 for output via wire 18.

Turbine 32 can operate independent from blades 26 and/or depending on rotation of blades 26. Turbine 32 avoids interfering with operation of other components of turbine 200. Turbine 32 is relatively lightweight, quiet, heat/snow/ice/rain resistant and can be maintained in a minimal manner due to magnetic levitation of foils 32.2 since less or no bearings can be included.

Figure 6:
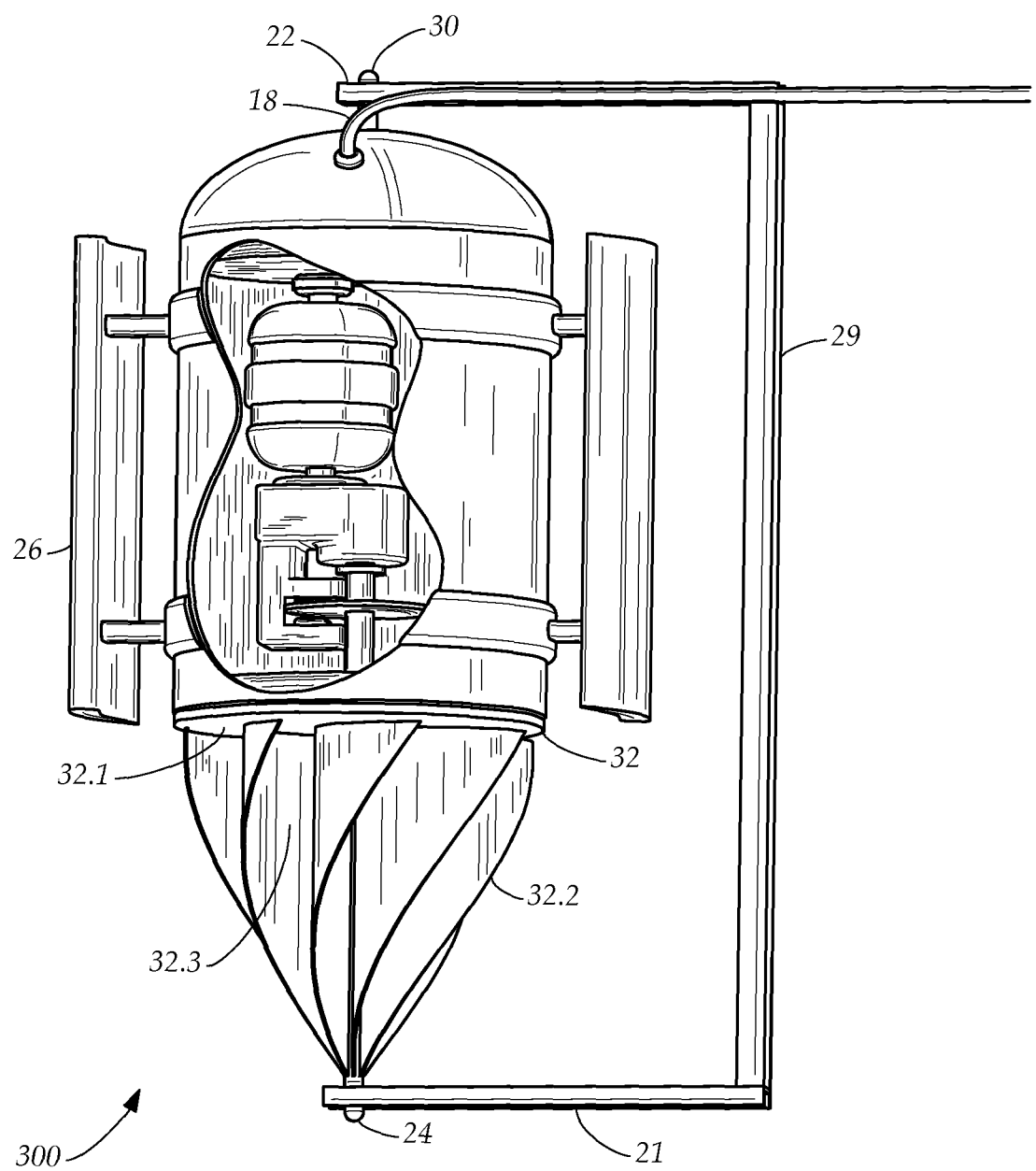
FIG. 6 illustrates a perspective view of an example embodiment of a vertical axis wind turbine having a bottom vertical axis wind turbine according to the present disclosure.

FIG. 6 illustrates a perspective view of an example embodiment of a vertical axis wind turbine having a bottom vertical axis wind turbine according to the present disclosure. Some elements of this figure are described above. Thus, same and/or similar reference characters identify same and/or like components described above and any repetitive detailed description thereof will hereinafter be omitted or simplified in order to avoid complication.

A turbine 300 is shown. A difference between FIGS. 5 and 6 is a placement of turbine 32. In FIG. 6, turbine 32 replaces cap 33 as shown in FIGS. 1-4*a*. Note that turbine 32 faces earth's surface, whether vertically or diagonally. Note that wire 18 can be extending along arm 21 instead of and/or in addition to arm 22.

Figure 7:
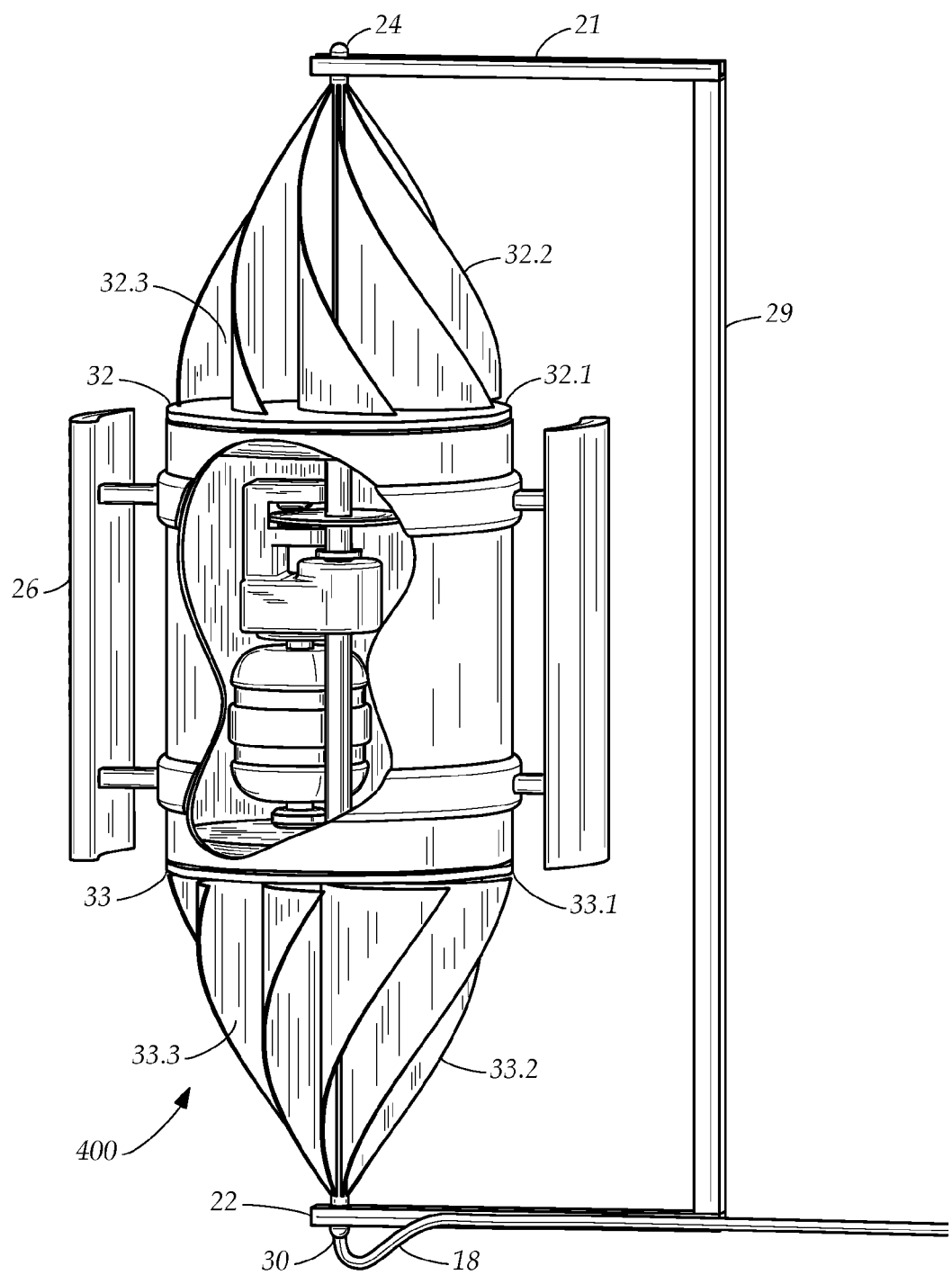
FIG. 7 illustrates a perspective view of an example embodiment of a vertical axis wind turbine having a plurality of vertical axis wind turbines according to the present disclosure.

FIG. 7 illustrates a perspective view of an example embodiment of a vertical axis wind turbine having a plurality of vertical axis wind turbines according to the present disclosure. Some elements of this figure are described above. Thus, same and/or similar reference characters identify same and/or like components described above and any repetitive detailed description thereof will hereinafter be omitted or simplified in order to avoid complication.

A turbine 400 is shown. A difference between FIGS. 6 and 7 is a placement of turbines 32, 33. In FIG. 7, turbine 32 replaces cap 32 and turbine 33 replaces cap 33, as shown in FIGS. 1-4*a*. Note that turbine 32 faces skyward, whether vertically or diagonally and turbine 33 faces earth's surface, whether vertically or diagonally. Also, note that turbines 32, 33 can be coaxial to each other or have different axis with each other. Additionally, note how turbine 32 and turbine 33 can output the generated electricity. For example, turbine 32 can output via wiring of shaft 24, such as within shaft 24, and arm 21, whether internal, external to and/or integral to arm 21 and/or output the generated electricity via wiring to shaft 316 to generator 313 for output via wire 18. Wire 18 can also extend along arm 21 and be coupled to shaft 24. Similarly, turbine 33 can output via wiring of shaft 30, such as within shaft 30, and arm 22, whether internal, external to and/or integral to arm 22 and/or output the generated electricity via wiring of shaft 316.

Figure 8:
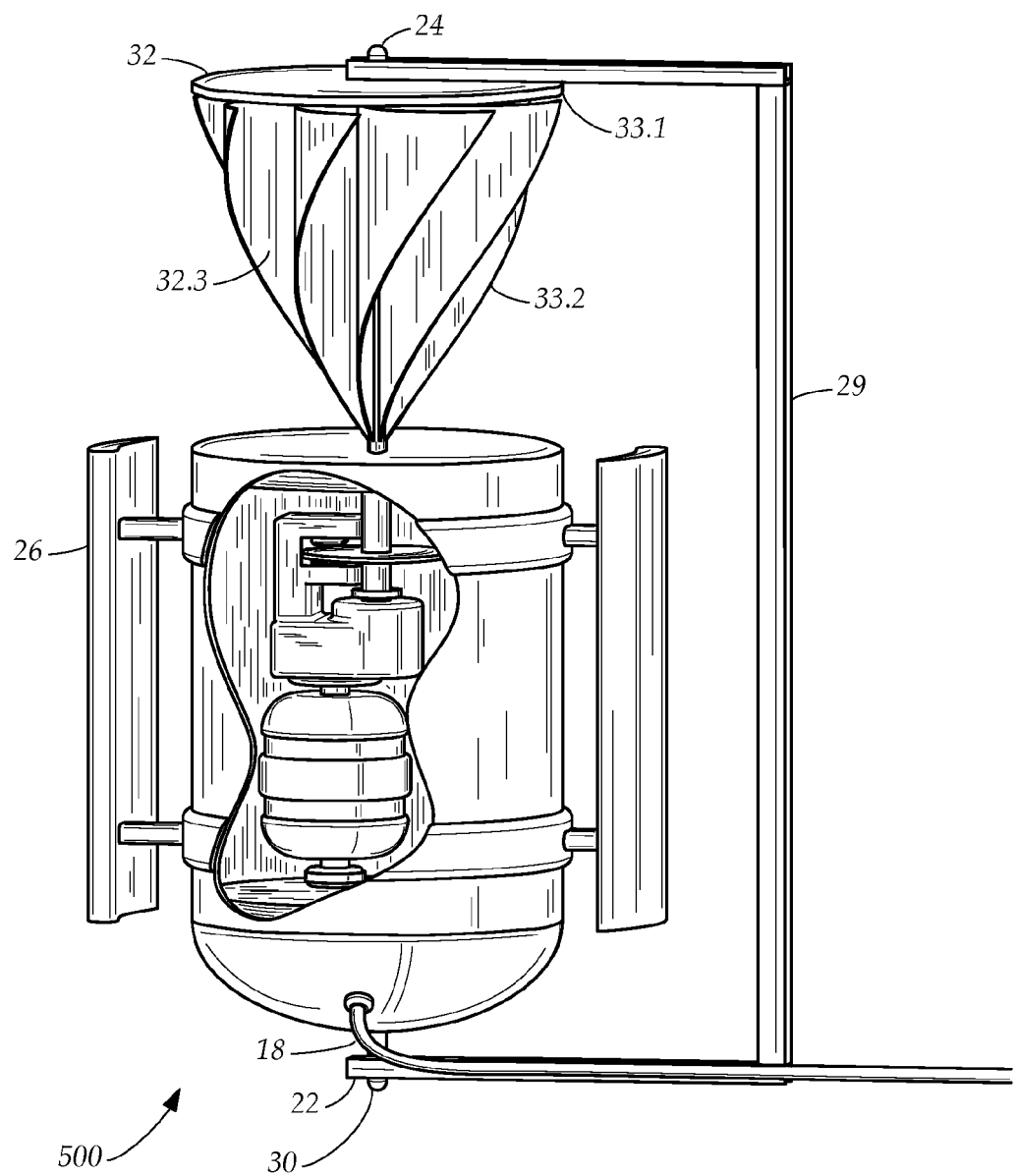
FIG. 8 illustrates a perspective view of an example embodiment of a vertical axis wind turbine having an inverted top vertical axis wind turbine according to the present disclosure.

FIG. 8 illustrates a perspective view of an example embodiment of a vertical axis wind turbine having an inverted top vertical axis wind turbine according to the present disclosure. Some elements of this figure are described above. Thus, same and/or similar reference characters identify same and/or like components described above and any repetitive detailed description thereof will hereinafter be omitted or simplified in order to avoid complication.

A turbine 500 is shown. A difference between FIGS. 5-7 and 8 is a placement of turbine 32. In FIG. 8, turbine 32 replaces cap 32, as shown in FIGS. 1-4*a*. Note that turbine 32 is inverted and faces earth's surface, whether vertically or diagonally. Also, note that turbine 32 and cap 33 can be coaxial to each other or have different axis with respect to each other. Additionally, note how turbine 32 can output the generated electricity. For example, turbine 32 can output via wiring of shaft 24, such as within shaft 24 whether toward generator 312 or toward arm 21, whether internal, external to and/or integral to arm 21. Wire 18 can also extend along arm 21 and be coupled to shaft 24. Note that another turbine 32, whether facing skyward or earthward, can be coupled to shown turbine 32 such that bases 32.1 of turbines 32 at least partially overlap each other and the another turbine 32 is more proximal to arm 21 than shown turbine 32 such that the shown turbine 32 is intermediate with respect to housing 23 and the another turbine 32. Such combination can be performed with any embodiments disclosed herein in any combinatory manner.

Figure 9:
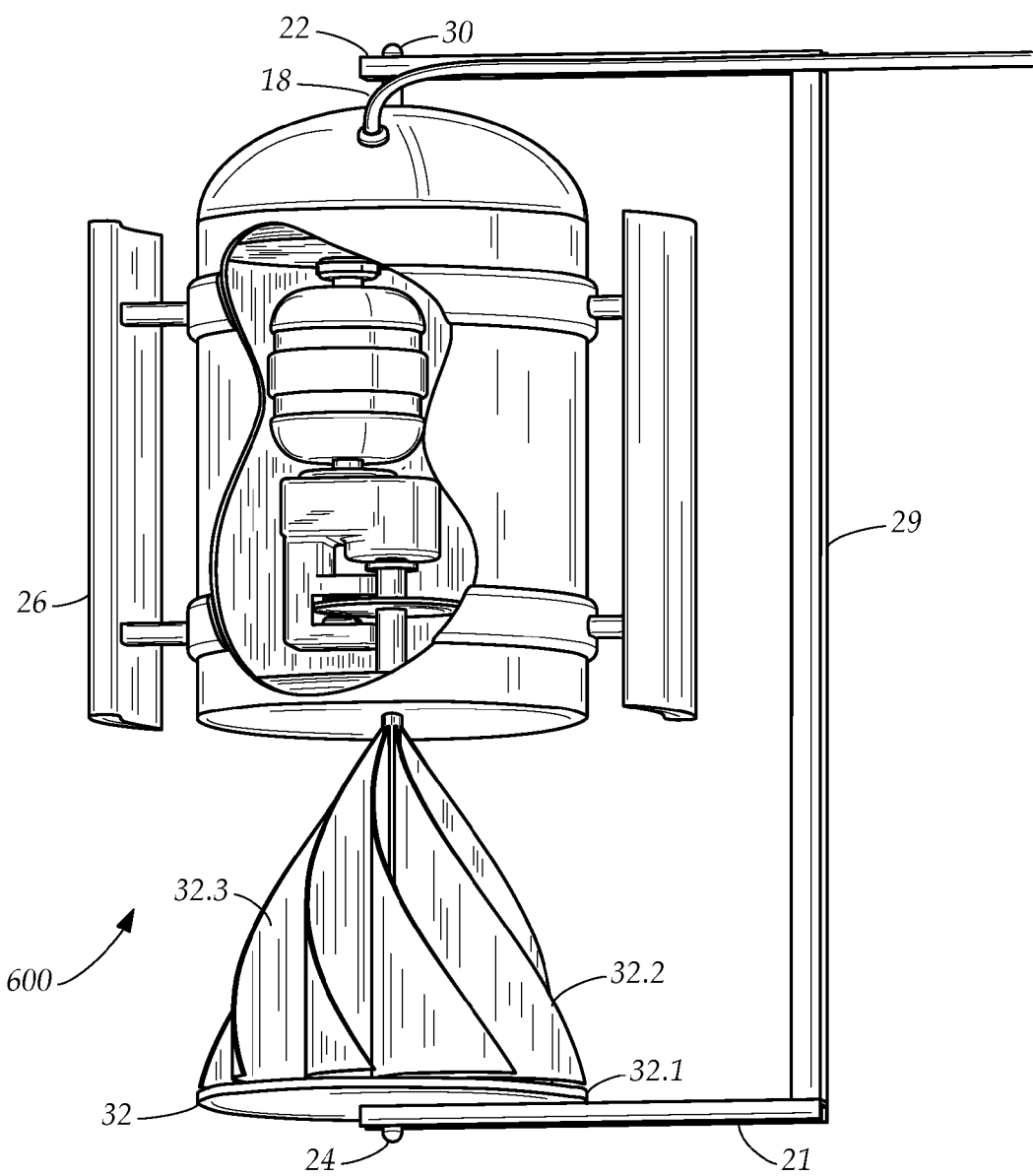
FIG. 9 illustrates a perspective view of an example embodiment of a vertical axis wind turbine having an inverted bottom vertical axis wind turbine according to the present disclosure.

FIG. 9 illustrates a perspective view of an example embodiment of a vertical axis wind turbine having an inverted bottom vertical axis wind turbine according to the present disclosure. Some elements of this figure are described above. Thus, same and/or similar reference characters identify same and/or like components described above and any repetitive detailed description thereof will hereinafter be omitted or simplified in order to avoid complication.

A turbine 600 is shown. A difference between FIGS. 5-8 and 9 is a placement of turbine 32. In FIG. 9, turbine 32 replaces cap 32, as shown in FIGS. 1-4a. Note that turbine 32 is inverted and faces skyward, whether vertically or diagonally. Also, note that turbine 32 and cap 33 can be coaxial to each other or have different axis with respect to each other. Additionally, note how turbine 32 can output the generated electricity. For example, turbine 32 can output via wiring of shaft 24, such as within shaft 24 whether toward generator 312 or toward arm 21, whether internal, external to and/or integral to arm 21. Wire 18 can also extend along arm 21 and be coupled to shaft 24. Note that another turbine 32, whether facing skyward or earthward, can be coupled to shown turbine 32 such that bases 32.1 of turbines 32 at least partially overlap each other and the another turbine 32 is more proximal to arm 21 than shown turbine 32 such that the shown turbine 32 is intermediate with respect to housing 23 and the another turbine 32. Such combination can be performed with any embodiments disclosed herein in any combinatory manner.

Note that any number of turbines 32, 33 whether facing skyward or earthward in any combinatory manner, can be coupled to housing 23, whether above housing 23 and/or below housing 23 in any combinatory manner. For example, any number of turbines 32, 33 can be stacked one above another whether below and/or above housing 23 in any combinatory manner or positioned horizontally adjacent to each other whether below and/or above housing 23 in any combinatory manner. Also, note that any number of caps 32, 33, whether facing skyward or earthward in any combinatory manner, can be used, such as in-between turbines 32, 33. Also note any number of turbines 32, 33 can be placed in-between housing 23 and caps 32, 33, whether facing skyward or earthward in any combinatory manner.

Figure 10:
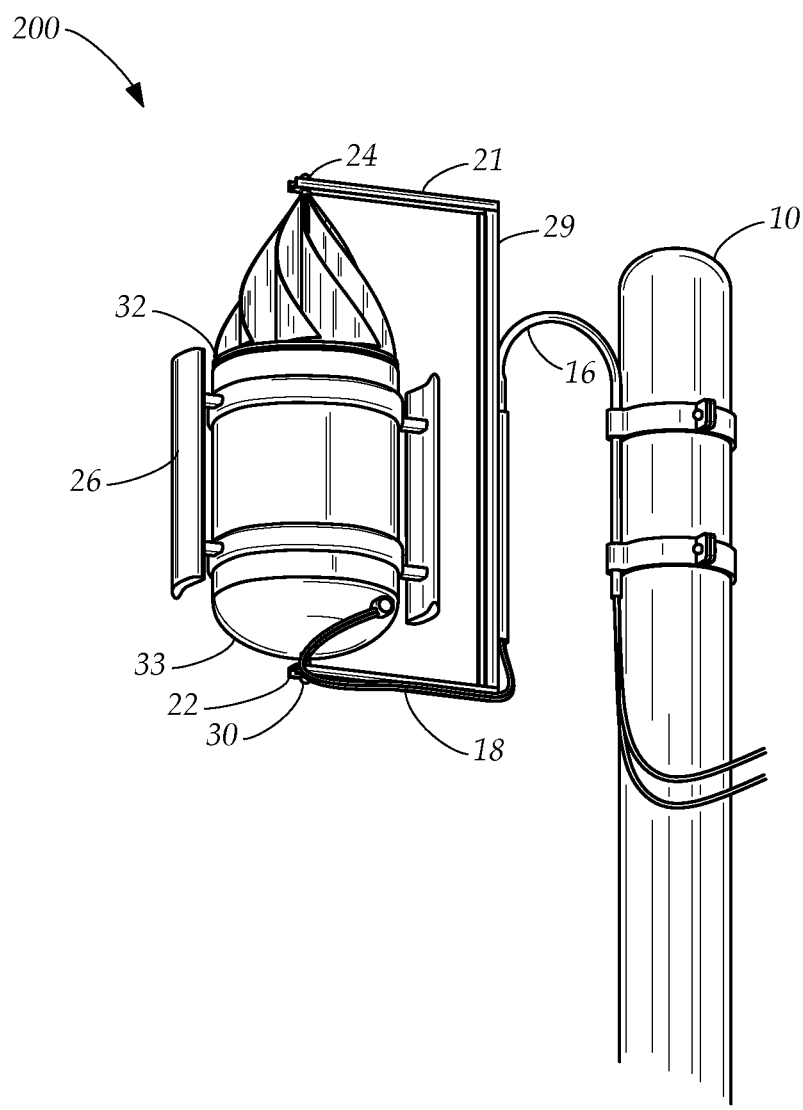
FIG. 10 illustrates a perspective view of an example embodiment of a vertical axis wind turbine having a top vertical axis wind turbine coupled to a utility pole according to the present disclosure.

FIG. 10 illustrates a perspective view of an example embodiment of a vertical axis wind turbine having a top vertical axis wind turbine coupled to a utility pole according to the present disclosure. Some elements of this figure are described above. Thus, same and/or similar reference characters identify same and/or like components described above and any repetitive detailed description thereof will hereinafter be omitted or simplified in order to avoid complication.

Turbine 200 is coupled to pole 10 and generates electricity as described herein.

Figure 11:
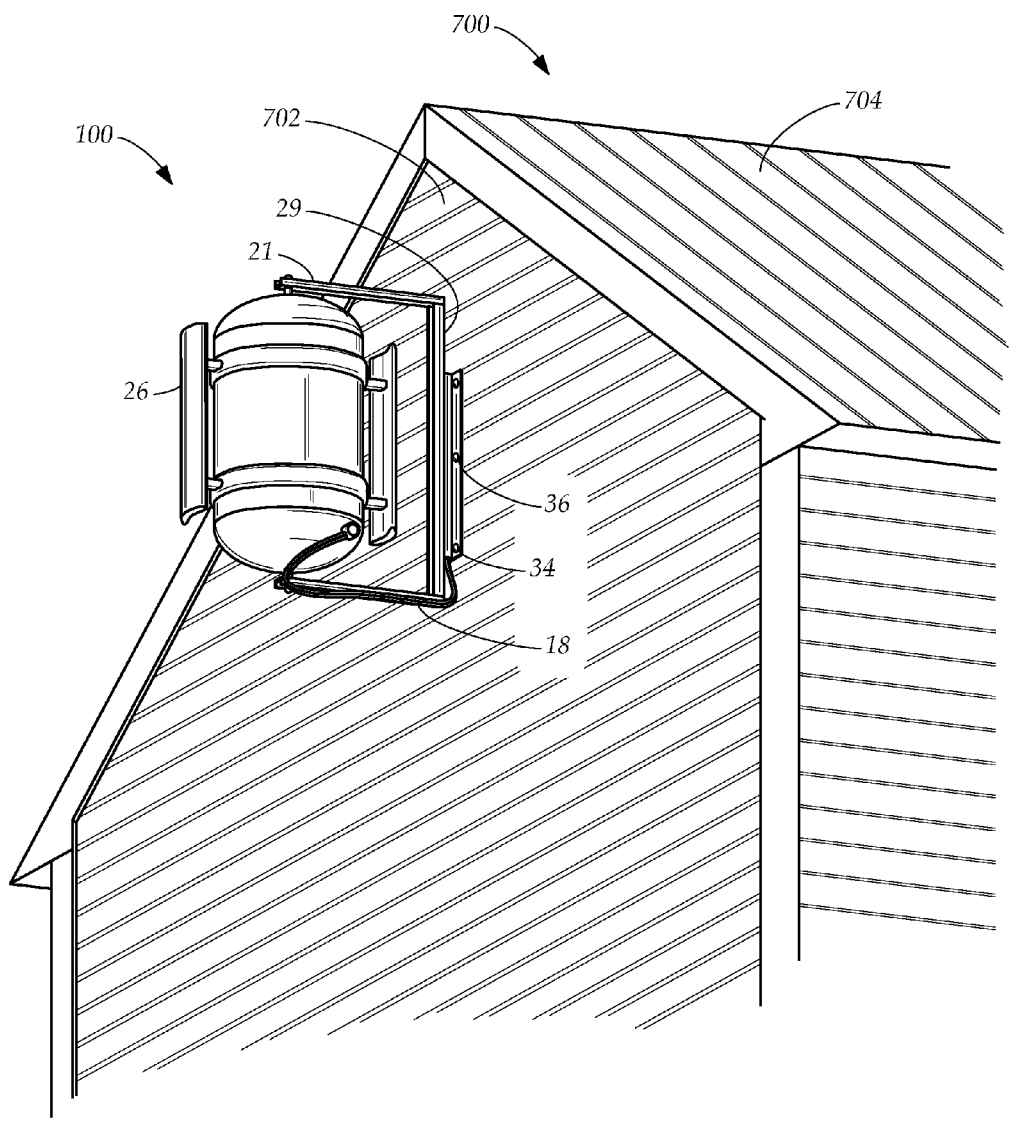
FIG. 11 illustrates an example mode of operation of a vertical axis wind turbine according to the present disclosure.

FIG. 11 illustrates an example mode of operation of a vertical axis wind turbine according to the present disclosure. Some elements of this figure are described above. Thus, same and/or similar reference characters identify same and/or like components described above and any repetitive detailed description thereof will hereinafter be omitted or simplified in order to avoid complication.

A building 700 has a sidewall 702 and a roof 704. Turbine 100 is coupled via rod 29 to sidewall 702. Rod 29 includes and/or is coupled to a bracket 34. Bracket 34 is coupled to sidewall 702 via a plurality of fasteners 36. Note that bracket 34 and fasteners 36 accommodate for wire 18. Note that turbine 100 can also be coupled to roof 704. Note that if rain flows from roof 704, turbine 100 can still generate electricity. Note that any turbines disclosed herein can be coupled to building 700 in any combinatory manner. Note that although sidewall 702 includes vinyl siding, any type of siding can be used.

Figure 12:
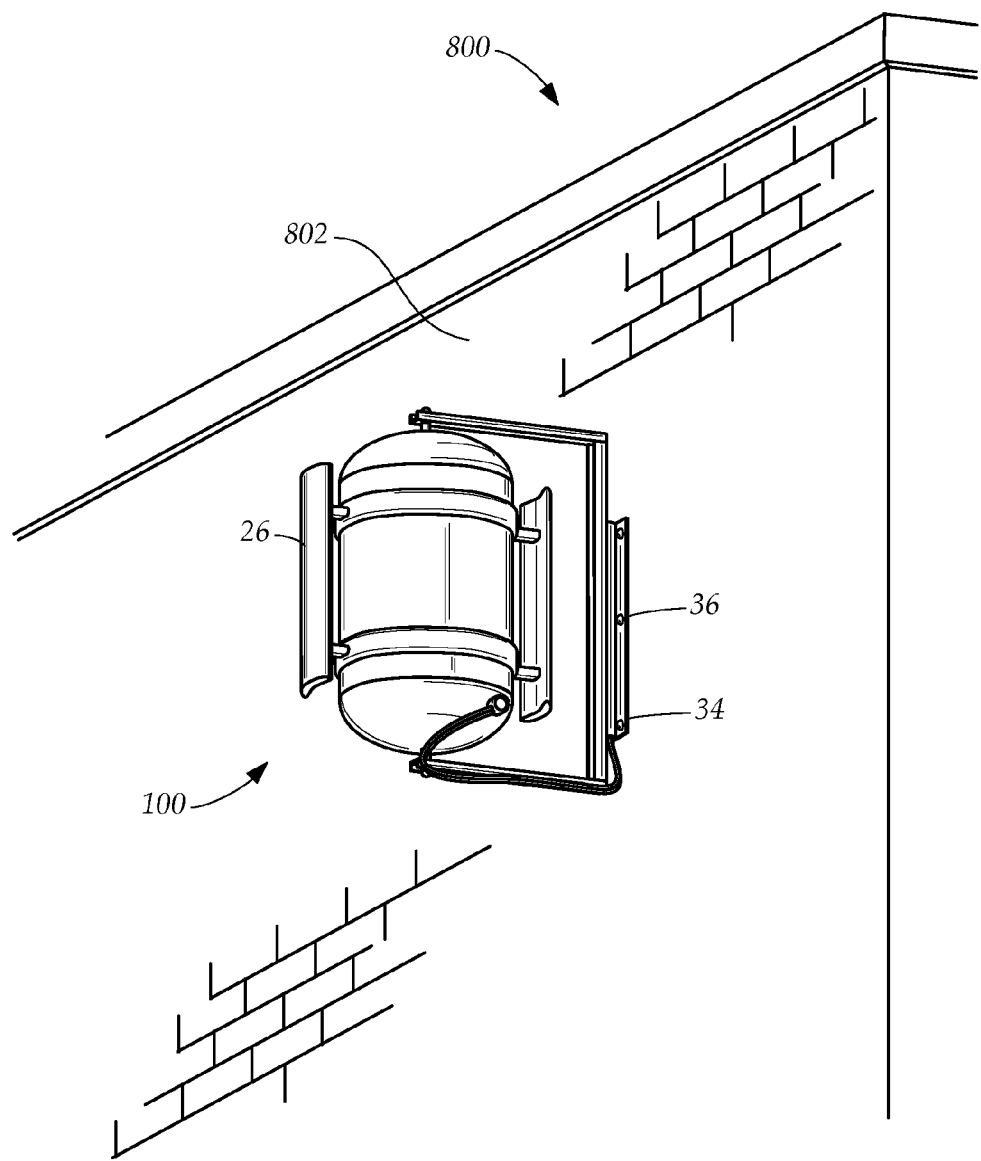
FIG. 12 illustrates an example mode of operation of a vertical axis wind turbine according to the present disclosure.

FIG. 12 illustrates an example mode of operation of a vertical axis wind turbine according to the present disclosure. Some elements of this figure are described above. Thus, same and/or similar reference characters identify same and/or like components described above and any repetitive detailed description thereof will hereinafter be omitted or simplified in order to avoid complication.

A building 800 includes a sidewall 802. Turbine 100 is coupled to sidewall 802 via rod 29, bracket 34 and fasteners 36. Note that bracket 34 and fasteners 36 accommodate for wire 18. Note that turbine 100 can also be coupled to roof of building 800. Note that if rain flows from such roof, turbine 100 can still generate electricity. Note that any turbines disclosed herein can be coupled to building 800 in any combinatory manner. Note that although sidewall 802 includes bricks, any type of wall building material can be used.

The present disclosure has been presented for purposes of illustration and description via example, but is not intended to be exhaustive or limited to the disclosure in the form disclosed. Many modifications and variations in techniques and structures are apparent to those of ordinary skill in the art without departing from the scope and spirit of the disclosure as set forth in the claims that follow. Accordingly, such modifications and variations are contemplated as being a part of the present disclosure. The scope of the present disclosure is defined by the claims, which includes known equivalents and unforeseeable equivalents at the time of filing of this application.

What is claimed is:

1. A vertical axis wind turbine comprising:
    a plurality of support arms;
    a housing coupled to said arms such that said housing is between said arms;
    a band extending around said housing;
    a blade coupled to said band;
    an electric generator housed within said housing, said generator operative based at least in part on said band and said blade rotating between said arms on a vertical rotation axis.

2. The turbine of claim 1, further comprising another blade coupled to said band, said another blade operative for rotation between said arms on said axis, at least one of said blade and said another blade vertically extending along said housing.

3. The turbine of claim 1, further comprising another band extending around said housing, said another band operative for rotation between said arms on said axis, said blade coupled to said another band.

4. The turbine of claim 1, wherein said housing is configured to rotate with said band and said blade on said axis.

5. The turbine of claim 4, further comprising a cap coupled to one of said arms and said housing such that said cap is between said one of said arms and said housing, said cap equipped with a bearing, said housing configured to rotate based at least in part on said bearing.

6. The turbine of claim 1, wherein said generator including a plurality of gears, said generator is operative based at least in part on said gears meshing with each other based at least in part on said blade rotating on said axis.

7. The turbine of claim 1, further comprising a vertical axis wind turbine apparatus coupled to one of said arms and said housing such that said turbine apparatus is between said one of said arms and said housing, said turbine apparatus including a base and a rotor, said base including a first magnet, said rotor including a second magnet, said rotor including a plurality of vertically spiraling foils, said rotor is positioned adjacent to said base such that said first magnet is disposed adjacent to said second magnet thereby causing said rotor to be rotatingly suspended above said base, said foils configured for vertical axis rotation independent of said blade.

8. The turbine of claim 7, wherein said blade and at least one of said foils are shaped differently.

9. The turbine of claim 8, wherein at least one of said foils is triangular in shape.

10. The turbine of claim 7, wherein said foils spiral in a direction away from said housing toward said one of said arms.

11. The turbine of claim 7, wherein said foils spiral in a direction away from said one of said arms toward said housing.

12. A system comprising:
a first vertical axis wind turbine including a plurality of support arms, a housing coupled to said arms such that said housing is between said arms, a band extending around said housing, a blade coupled to said band, and an electric generator housed within said housing, wherein said generator is operative based at least in part on said band and said blade rotating between said arms on a vertical rotation axis;
a second vertical axis wind turbine coupled to one of said arms and said housing such that said second turbine is between said one of said arms and said housing, said second turbine including a base and a rotor, said base including a first magnet, said rotor including a second magnet, said rotor including a plurality of vertically spiraling foils, said rotor is positioned adjacent to said base such that said first magnet is disposed adjacent to said second magnet thereby causing said rotor to be rotatingly suspended above said base, said foils configured for vertical axis rotation independent of said blade, said blade and at least one of said foils are shaped differently.

13. The system of claim 12, wherein said first turbine further comprising another blade coupled to said band, said another blade operative for rotation between said arms on said axis, at least one of said blade and said another blade vertically extending along said housing.

14. The system of claim 12, wherein said first turbine further comprising another band extending around said housing, said another band operative for rotation between said arms on said axis, said blade coupled to said another band.

15. The system of claim 12, wherein said housing is configured to rotate with said band and said blade on said axis, said first turbine further comprising a cap coupled to another one of said arms and said housing such that said cap is between said another one of said arms and said housing, said cap opposing said second turbine, said cap equipped with a bearing, said housing configured to rotate based at least in part on said bearing.

16. The system of claim 12, wherein said generator including a plurality of gears, said generator is operative based at least in part on said gears meshing with each other based at least in part on said blade rotating on said axis.

17. The system of claim 12, wherein said foils spiral in a direction away from said housing toward said one of said arms.

18. The system of claim 12, wherein said foils spiral in a direction away from said one of said arms toward said housing.

19. The system of claim 12, further comprising a third vertical wind axis turbine coupled to another one of said arms and said housing such that said third turbine is between said another one of said arms and said housing, said third turbine including a base and a rotor, said base including a first magnet, said rotor including a second magnet, said rotor including a plurality of vertically spiraling foils, said rotor is positioned adjacent to said base such that said first magnet is disposed adjacent to said second magnet thereby causing said rotor to be rotatingly suspended above said base, said foils configured for vertical axis rotation independent of said blade, said blade and at least one of said foils are shaped differently.

20. A method comprising:
receiving electric current generated at least in part via operation of a system including a first vertical axis wind turbine and a second vertical axis wind turbine, said first turbine including a plurality of support arms, a housing coupled to said arms such that said housing is between said arms, a band extending around said housing, a blade coupled to said band, and an electric generator housed within said housing, wherein said generator is operative based at least in part on said band and said blade rotating between said arms on a vertical rotation axis, said second turbine coupled to one of said arms and said housing such that said second turbine is between said one of said arms and said housing, said second turbine including a base and a rotor, said base including a first magnet, said rotor including a second magnet, said rotor including a plurality of vertically spiraling foils, said rotor is positioned adjacent to said base such that said first magnet is disposed adjacent to said second magnet thereby causing said rotor to be rotatingly suspended above said base, said foils configured for vertical axis rotation independent of said blade, said blade and at least one of said foils are shaped differently.

* * * * *